United States Patent
Akaighe et al.

(10) Patent No.: US 10,711,175 B2
(45) Date of Patent: *Jul. 14, 2020

(54) COMPOSITIONS AND METHODS FOR CONTROLLING PARAFFIN AND ASPHALTENE PROBLEMS IN WELLS

(71) Applicant: Sasol Performance Chemicals GmbH, Hamburg (DE)

(72) Inventors: Nelson Akaighe, Lake Charles, LA (US); Jorge Fernandez, Lake Charles, LA (US); Christian Jones, Sulphur, LA (US); Paul Filler, Loveland, CO (US)

(73) Assignee: Sasol Performance Chemicals GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/325,882

(22) PCT Filed: Jul. 14, 2015

(86) PCT No.: PCT/US2015/040365
§ 371 (c)(1),
(2) Date: Jan. 12, 2017

(87) PCT Pub. No.: WO2016/011018
PCT Pub. Date: Jan. 21, 2016

(65) Prior Publication Data
US 2017/0145290 A1    May 25, 2017

Related U.S. Application Data

(60) Provisional application No. 62/024,900, filed on Jul. 15, 2014.

(51) Int. Cl.
*C09K 8/524* (2006.01)
*E21B 37/06* (2006.01)

(52) U.S. Cl.
CPC ............. *C09K 8/524* (2013.01); *E21B 37/06* (2013.01)

(58) Field of Classification Search
CPC ...... C09K 8/524; C09K 2208/34; C09K 8/00; C09K 8/035; C09K 8/528; C09K 2208/20; C09K 8/03; C09K 8/40; C09K 8/42; C09K 8/52; C09K 8/532; C09K 8/584; C09K 8/602; C09K 8/74; E21B 37/06

See application file for complete search history.

(56) References Cited

U.S. PATENT DOCUMENTS

| | | | |
|---|---|---|---|
| 4,077,471 A * | 3/1978 | Shupe | C09K 8/584 166/270.1 |
| 6,010,989 A * | 1/2000 | Krull | C10L 1/143 44/393 |
| 7,629,299 B2 | 12/2009 | Berger et al. | |
| 2007/0265171 A1 | 11/2007 | Javora et al. | |
| 2008/0261836 A1 | 10/2008 | Filler et al. | |
| 2009/0114247 A1 | 5/2009 | Brown et al. | |
| 2014/0284057 A1 * | 9/2014 | Champagne | C09K 8/602 166/305.1 |

FOREIGN PATENT DOCUMENTS

| | | | |
|---|---|---|---|
| CN | 101717626 | * | 6/2010 |
| EP | 0900836 | | 3/1995 |
| EP | 0900836 | * | 3/1999 |
| WO | WO97/12947 | | 4/1997 |
| WO | 2010/044818 | | 4/2010 |

* cited by examiner

*Primary Examiner* — Kumar R Bhushan
(74) *Attorney, Agent, or Firm* — Bushman Werner, P.C.

(57) ABSTRACT

A composition and method for controlling heavy hydrocarbons in down-hole environments and with associated equipment used in oil and gas well operations. The composition and method comprising an ether and optionally an ester, an alkoxylated alcohol or a hydrocarbon co-solvent. The compositions and methods are useful in controlling heavy hydrocarbons such as paraffins and asphaltenes by dissolving paraffins, suspending paraffins and asphaltenes and dissolving heavy oils, both down-hole and with associated equipment.

13 Claims, 2 Drawing Sheets

NTDA-3  NTDA-5  NTDA-6    NTDA-8  NTDA-9  NTDA-12  BLANK

Blank        60 ppm       120 ppm      240 ppm      500 ppm

Blank        60 ppm       120 ppm      240 ppm      500 ppm

Blank     60 ppm     120 ppm     240 ppm     500 ppm

Blank     60 ppm     120 ppm     240 ppm     500 ppm

COMPOSITIONS AND METHODS FOR CONTROLLING PARAFFIN AND ASPHALTENE PROBLEMS IN WELLS

CROSS REFERENCE TO RELATED APPLICATION

This application is a national phase of PCT/US2015/040365, filed Jul. 14, 2015, which in turn claims priority to U.S. Application No. 62/024,900 filed on Jul. 15, 2014, the disclosures of which are incorporated herein by reference for all purposes.

FIELD OF THE INVENTION

Present invention relates to the control of heavy hydrocarbon problems in oil and gas wells, and more particularly, to the control of paraffin and asphaltene problems in such wells.

BACKGROUND OF THE INVENTION

Heavy hydrocarbons such as paraffins and asphaltenes are commonly found in a wide variety of crude oil from many different areas, from field to field in the same area and indeed in certain cases from well to well in the same field.

Asphaltenes are large aromatic agglomerates composed primarily of heterocyclic rings which are normally held in solution/suspension in crude oil by naturally occurring, petroleum resins that adhere to the outer surface of the asphaltene agglomerate. However, it is well known that they can precipitate and deposit in production lines, transfer lines, storage tanks etc particularly where pressure drops allow the resins to desorb.

Paraffins on the other hand are saturated hydrocarbon waxes that precipitate and deposit in areas where decreases in temperature below the solubility temperature of the paraffins in the crude oils results in the appearance of wax. This is commonly known as the wax apparent temperature (WAT). Asphaltenes and paraffins have the common characteristics that they can inhibit or block production from the well, foul transportation lines and form unwanted deposits in storage tanks.

Because of their differences in character, the control of asphaltenes may not necessarily result in the control of paraffins and vice versa. Accordingly crude oil is tested to determine paraffin/asphaltene content to determine what form of treatment best suits the particular crude oil. Complicating the problem is that in most crude oils both asphaltenes and paraffins are found albeit that one may be present in a much larger amount then the other.

The problem of heavy hydrocarbon control i.e. paraffin and asphaltene control, involves two main approaches (1) removing already formed deposits where they are causing a problem and (2) minimizing the formation of deposits. As is well understood by those in the art because of the complexity of the problem there is generally not one solution to controlling asphaltene problems and paraffin problems.

With respect to existing deposits, in the case of paraffins, as noted above, even slight changes in an equilibrium condition involving the solution of the paraffin waxes in crude oil can cause precipitation of the paraffin wax. One such change of an equilibrium condition can be reduced temperatures.

In the case of paraffins, it is known that particulate matter in the crude oil speeds precipitation of the wax since such particulates act as a nucleus for the formation of large paraffin particles from smaller particles suspended in the crude oil. It is these larger particles which, under certain conditions will precipitate forming the problems discussed above.

In the case of asphaltene deposits, asphaltenes and other heavy hydrocarbon materials such as asphaltenes are frequently found as suspended solid particles in the crude oil. These heavy asphaltene type molecules often occur in colloidally suspended solid particles which fall out of the crude oil e.g. precipitate, where conditions that kept them dispersed changed. Many of the same factors affecting the buildup of paraffin wax and its precipitation are the same factors which will lead to the precipitation of asphaltenes and similar heavy hydrocarbons from the crude oil. It is also known that asphaltenes and the problems caused thereby generally occur in the well adjacent producing formations, which is generally not the case with paraffin wax formation.

A commonly used solvent, BETX (benzene, ethylbenzene, toluene, and xylene), has been used and is effective at removing paraffins deposits but is encountering increasing resistance to use due to environmental concerns, governmental regulations, particularly on offshore applications, and relatively low flashpoint which poses further safety problems during transport and handling.

SUMMARY OF THE INVENTION

In one aspect, the present invention provides a composition for removing paraffin wax from tubing, transfer lines, well head equipment storage facilities and the like.

In another aspect, the present invention provides a composition for removing asphaltene deposits, heavy tar and the like from well bores, production tubing, storage facilities etc.

In a further aspect, the present invention provides a method for treating well bores, production equipment and storage tanks to remove paraffin and asphaltene deposits.

In still a further aspect the present invention provides compositions and methods for inhibiting precipitation of paraffin waxes and asphaltenes from crude oil.

These and further features and advantages of the present invention will become apparent from the following detailed description, wherein reference is made to the figures in the accompanying drawings.

DETAILED DESCRIPTION OF PREFERRED EMBODIMENTS

Figure 1:
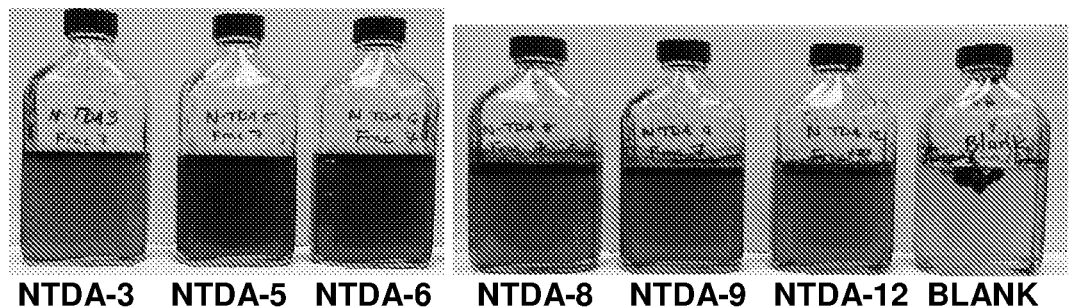
FIG. 1 shows the performance of various ethoxylates in crude oil and deionized water.

As is known by those skilled in the art, liquids having a high flash point are desirable for any solvent/composition employed for almost any kind of treatment of an oil/gas well, peripheral equipment such as tubes, flowlines, storage tank, etc. Accordingly, the compositions and methods of the present inventions can employ ethers containing from about 8 to about 30 carbon atoms and having the general formula:

$$R—O—R_1 \qquad \text{I}$$

wherein R and $R_1$ are each alkyl groups, independent of each other that can be linear or branched 2 to 30 carbon atoms. Preferably each of R and $R_1$ contain from 5 to 7 carbon atoms.

Non-limiting examples of suitable ethers include dibutyl ether, dihexyl ether, diheptyl ether, dioctyl ether, dinonyl ether, didecyl ether, hexyl-octyl ether, hexyl-heptyl ether, di(2-ethyl hexyl) ether, di(2-propyl heptyl) ether etc. Thus the ether can be symmetrical or asymmetrical and can comprise a mixture of the various ethers, e.g. a symmetrical ether and an asymmetrical ether.

The compositions of the present invention can comprise a mixture of one or more of the ethers described above with a surfactant which can be (1) ester with one or more than one ester group, (2) an alkoxylated alcohol, or (3) mixtures thereof.

The basic esters useful in the compositions of the present invention will have the general formula:

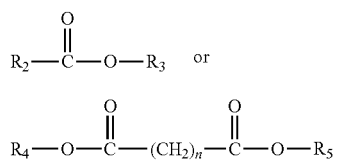

Where $R_2$ to $R_5$ are linear or branched alkyl groups having from 1 to 30 carbon atoms, and n is from 0 to 20.

Non-limiting examples of typical carboxylic acids that can be employed in making the monobasic esters include formic acid, acetic acid, valeric acid, caprylic acid, lauric acid, arachidic acid, etc. Non-limiting examples of typical carboxylic acids that can be employed in making the dibasic esters include oxalic acid, malonic acid, succinic acid, glutaric acid, adipic acid, pimelic acid, phthalic acid, azelaic acid, etc. Non-limiting examples of typical carboxylic acids that can be employed in making the tribasic esters include citric acids, aconitric acid, trimesic acid, propane-1, 2, 3-tricarboxylic acid, etc.

The alcohols useful in forming the esters of the present invention comprise monohydroxy alcohols containing from 6 to 20 carbon atoms and can be linear alcohols, branched alcohols, or Guerbet alcohols (generally described as 2-alkyl-1-alcohols). Non-limiting examples of suitable alcohols include methanol, ethanol, propanol, butanol, hexanol, octanol, decanol, 2-butyl-1-octanol, 2-propyl-1-heptanol, 2-ethyl-1-hexanol, etc.

As noted, in addition to the esters described above, the surfactants useful in forming the compositions and used of the present invention can include a wide variety of alkoxylated alcohols. In general the alkoxylated alcohols useful in the present invention will have the general formula:

$$CH_3(C_xH_{2x})—O—(C_nH_{2n}O)_y—(C_2H_4O)_z—H \qquad \text{IV}$$

wherein x is from 3 to 30
n is from 2-4,
y is from 0 to 6, and
z is from 3 to 20.
In particular, preferred alkoxylated alcohols are ethoxylated alcohols when
x is from 5 to 29, y is 0,
z is from 3 to 12.

Non-limiting examples of alkoxylated alcohols that can be employed in making the esters are isotridecyl alcohol, isodecyl alcohol, 2-propyl heptanol, 2-ethyl hexanol, lauryl alcohol etc.

In addition to the components listed above, the compositions of the present invention can include a co-solvent or carrier which is generally hydrocarbon in nature. It is also important to mention that the ethers described earlier can serve as both a solvent and carrier fluid at the same time. Typically the carrier has a significant content of napthenic and/or highly branched paraffins. As a general rule the co-solvent can contain from about 20% to about 90% or greater napthenics, isoparaffins, or a mixture thereof. In particular, the carriers having such a composition will contain hydrocarbons ranging from about $C_8$ to about $C_{30}$. Table 1 below lists non-limiting examples of the wide variety of carriers which can be employed in the compositions of the present invention.

TABLE 1

|  | LPA | LPA-142 | LPA-170 | LPA-210 | Diesel | HF-1000 | ODC-15 |
|---|---|---|---|---|---|---|---|
| Linear Isoparaffins (mol %) | — | — | — | — | 41.3[1] | 20.9 | — |
|  | 25 | 21 | 28 | 30 |  | 14 | 25 |
| Olefins | — | — | — | — | — | 24.89 | — |
| Napthenics (mono-cyclic) (mol %) | 62 | 64 | 60 | 69 | 22.1[2] | 30 | 47 |
| Decalins (bi-cyclic) (mol %) | 13 | 15 | 12 | 1 | 11.9[3] | — | 10 |
| Aromatics | — | — | — | — | 24.7 | — | 15 |
| Oxygenates | — | — | — | — | — | 3.84 | — |
| Carbon chain range | C10-C16 | C-11-C12 | C12-C14 | C14-C16 | C10-C20 | C12-C22 | C10-C16 |

[1]Depends on specific diesel
[2]Also contains 2.3% tricyclic
[3]Alcohols, esters As can be seen from Table 1, the co-solvent can comprise liquid hydrocarbons having from about 10% to about 35% isoparaffins, from about 30% to about 73% napthenics, and having a carbon chain length of from about C8 to about C30. As can also be seen from Table 1, some of the carriers can include significant amounts of linear paraffins while others can contain small amounts of oxygenates such as alcohols, esters or the like. As should also be apparent from Table 1, some of the carriers can contain olefins while others e.g. diesel, can contain significant amounts of aromatics. In general Table 1 demonstrates that in the compositions of the present invention, the optional co-solvent can employ, with advantage, a wide variety of hydrocarbons albeit that other compounds can be present in certain cases. It will also be understood that although diesel can be employed, it is not preferred as a carrier primarily because of its higher aromatics content making it less ecologically desirable.

When used as a solvent only to dissolve or breakup paraffin/asphaltene solids, the ether content used in the method of the present invention may be present in an amount up to 100%. When a co-solvent is employed to dissolve or breakup paraffin/asphaltene solids, the ether content may be present in an amount up to 95%. Furthermore, to disperse/inhibit paraffin and asphaltene solids in production tubings, flowlines etc, the ether content of the present invention may be present in an amount up to 99 wt % of the total formulation. The dispersant/inhibitor surfactant composition will generally be present in an amount from about 0.006 to about 5 wt % of the total formulation. When a co-solvent is employed, the co-solvent-ether content could amount up to 99 wt % of the total formulation.

To more fully explain the compositions and methods of the present invention, a discussion of the makeup of typical heavy oils containing high amounts of paraffins and/or asphaltenes is useful. Table 2 below shows the compositions of two typical heavy oils, Frac #6 and Frac #7:

TABLE 2

| Test Parameters | Frac #6 | Frac #7 |
|---|---|---|
| Paraffins (% wt) | 29.5 | 29.4 |
| Asphaltenes (% wt) | 69.2 | 29.3 |
| Oily Constituents (% wt) | 1.3 | 41.4 |
| Pour Point (° F.) | 79 | 147 |

As can be seen from Table 2 the test results indicated that Frac #6 oil is highly asphaltic with considerable amount of paraffins, while Frac #7 has approximately equal amounts of asphaltenes and paraffins.

It is noteworthy to highlight the importance of crude oil analysis since this helps in initial selection of carrier solvents effective at penetrating and dissolving a particular crude oil type. For instance, aromatic-based solvents like BETX are very effective at dissolving/breaking up asphaltic crude oils, but less effective at dissolving or breaking up paraffinic crude oils.

To determine the effectiveness of the compositions of the present invention as to their ability to penetrate, dissolve or breakup paraffin wax and/or asphaltenes in crude oil, the compositions of the present invention were tested against d-limonene. Table 3 below shows graphically a solvency test on paraffin wax extracted from Frac #6 shown in Table 2. Fundamentally Table 3 depicts the ability of certain compositions of the present invention to penetrate, breakup or dissolve paraffin solids.

TABLE 3

| | Paraffin dissolved/dispersed (wt %) | |
|---|---|---|
| Solvent | 30 Min | 2 Hours |
| 6040 Ether 6/LPA 142 | 10.1 | 100.0 |
| HF1000 | 6.5 | 17.3 |
| Ether 6 | 12.6 | 31.5 |
| 6040 Ether 6/HF1000 | 9.0 | 100.0 |
| 6040 LPA 142/Ether 6 | 10.5 | 37.6 |
| 9010 HF1000/LPA 110 | 9.9 | 27.4 |
| D-Limonene | 34.7 | 100.0 |

As can be seen from Table 3, dihexyl ether (Ether 6) by itself performs poorly in comparison to d-limonene, however, mixtures of dihexyl ether with specific amount of the co-solvents listed in Table 1 show results comparable to d-limonene. In this regard note for example that a mixture of 60% dihexyl ether and 40% LPA 142 has the same efficacy as d-limonene after two hours. Likewise, a mixture of 60% dihexyl ether and 40% HF-1000 shows substantially the same efficacy as d-limonene after two hours. This highlights the necessity for analysis of the crude oil to determine its composition and then screen a combination of ingredients making up the compositions of the present invention best suited for the particular crude oil in question. While the dihexyl ether, in and of itself, shows poor solvency properties as compared to d-limonene, compositions containing specific amounts of the co-solvent listed in Table 1 with dihexyl ether or one of the other ethers are useful since the ethers increase the flashpoint of the mixture. In this regard it is desired that the flashpoints of the compositions of the present invention, regardless of their makeup, be greater than about 140° F. The hexyl ether used in this present invention has a flash point of 207° F., while the technical grade d-limonene has a flash point of 110° F. (Table 4).

TABLE 4

| Solvent | Flash Point (° F.) | Kauri-Butanol Value |
|---|---|---|
| Toluene | 43 | 102 |
| Xylene | 77 | 98 |
| LPA 142 | 142 | 34 |
| HF1000 | 178 | 18 |
| D-Limonene | 110 | 67 |
| Hexyl Ether | 207 | 95 |

Table 5 shows a comparison of d-limonene and certain components making up the compositions of the present invention vis-à-vis their ability to dissolve asphaltenes extracted from Frac #6 oil.

TABLE 5

| | Asphaltene dissolved/dispersed (wt %) | |
|---|---|---|
| Solvent | 30 Min | 2 Hours |
| NACOL Ether 6 | 0.0 | 0.0 |
| HF1000 | 3.8 | 15.5 |
| LPA 110 | 1.1 | 23.5 |
| LPA 142 | 4.5 | 5.5 |
| ODC-15 | 0.0 | 0.7 |
| D-Limonene | 8.8 | 31.6 |

As can be seen from Table 5, dihexyl ether in and of itself shows virtually no ability to dissolve pure asphaltene solids. However, some of the co-solvents listed in Table 1 are more effective but still not as effective as d-limonene. It is important to highlight the fact that most crude oils contain a combination of paraffin and asphaltene molecules, and the presence of even small amounts of paraffin molecules enable easier penetration and dissolution of the crude by linear solvents such as dihexyl ether. A comparison of the data shown in Table 3 with that in Table 5 emphasizes the value of testing the crude oil to determine its content e.g. paraffins/asphaltenes, to select the proper components in formulating the most effective compositions according to the present invention.

Table 6 below shows a comparison of limonene with various compositions according to the present invention and their ability to dissolve Frac #7 heavy oil which as can be seen from Table 2 has approximately the same amount of paraffins and asphaltenes.

TABLE 6

| | Dispersed/Dissolved (wt %) | | |
|---|---|---|---|
| Solvent | 30 Min | 2 Hours | 6 Hours |
| LPA 142 | 11.8 | 22.8 | 64.3 |
| 4060 Ether 6/LPA 142 | 11.5 | 20.5 | 100 |
| HF1000 | 0.0 | 3.8 | 46.5 |
| Ether 6 | 10.0 | 17.3 | 100 |
| 4060 Ether 6/HF1000 | 1.9 | 22.3 | 100 |
| 6040 Ether 6/HF1000 | 14.2 | 100 | 100 |
| D-limonene | 17.5 | 44.2 | 100 |

As can be seen from Table 6, several of the compositions of the present invention are equally effective as d-limonene in dissolving Frac #7 heavy oil. In particular dihexyl ether in and of itself has substantially the same efficacy as d-limonene after six hours. Since dihexyl ether has a much higher flashpoint than d-limonene, and also stable supply and pricing that is not affected by poor crop harvest due to bad weather conditions, it would be chosen in many applications even considering cost considerations. Further, a mixture of 40% dihexyl ether and 60% LPA 142 again has the same efficacy as d-limonene after 6 hours. More significantly, a mixture of 60% dihexyl ether and 40% HF1000 show superior solvency or efficacy than d-limonene after 2 hours.

The data shown in Tables 3, 5 and 6 shows that various compositions according to the present invention are as effective as d-limonene in dissolving/dispersing crude heavy oil and in certain cases paraffin waxes extracted from heavy crude. Indeed, as can be seen with respect to Table 6, dihexyl ether, in and of itself, can be used in lieu of d-limonene in a method to dissolve/disperse certain heavy crude oils and since dihexyl ether has a higher flashpoint, stable supply and pricing than d-limonene would be chosen in many circumstances (Table 4).

As noted above, in the control of problems created by paraffin and asphaltenes in crude oils, one problem is removal of deposits after they have formed on surfaces e.g. tubing and other equipment associated with the production and gathering of oil and gas, and the other problem is how to keep the paraffin/asphaltene solids dispersed in the crude as well as water wet the oily solids present in the crude. To this end, one of the surfactants described above namely an alkoxylated alcohol was tested to determine (1) its ability to effectively disperse paraffin/asphaltene solids in the crude oils and (2) its ability to water wet oily solids present in the crude and drop the solids into the water phase. Accomplishing the later of course produces cleaner and brighter crude oils.

In conducting these tests, a series of alkoxylated alcohols were employed. The crude oil used in the tests was Frac #7 described above, the goal being to determine if the paraffin/asphaltene solids present in the Frac #7 crude could be maintained in a dispersed state. The ethoxylated alcohols employed were ethoxylated $C_{13}$ branched alcohols having various numbers of moles of added ethylene oxide. The ethoxylates are referred to hereafter as NTDA-3, NTDA-5, NTDA-6, NTDA-8, NTDA-9 and NTDA-12. In the nomenclature above the number following the letters "NTDA" refers to the number of moles of ethylene oxide present in the molecule.

Tests were performed both in deionized water (DI) as well as produced water (PW) at a level of 90,000 TDhows the S (total dissolved solids). All tests were conducted in bottles as seen hereafter in the following examples.

Example 1

This example demonstrates the dispersability characteristics of the ethoxylates in relation to deionized water. The results of the test are shown in FIG. 1. As can be seen from FIG. 1, the ethoxylates containing 5 to 6 moles of ethylene oxide disperse more oil into the water which could create an emulsion problem in certain crude oils. However, as can also be seen all of the ethoxylates shown had significant dispersability capabilities.

Example 2

Figure 2:
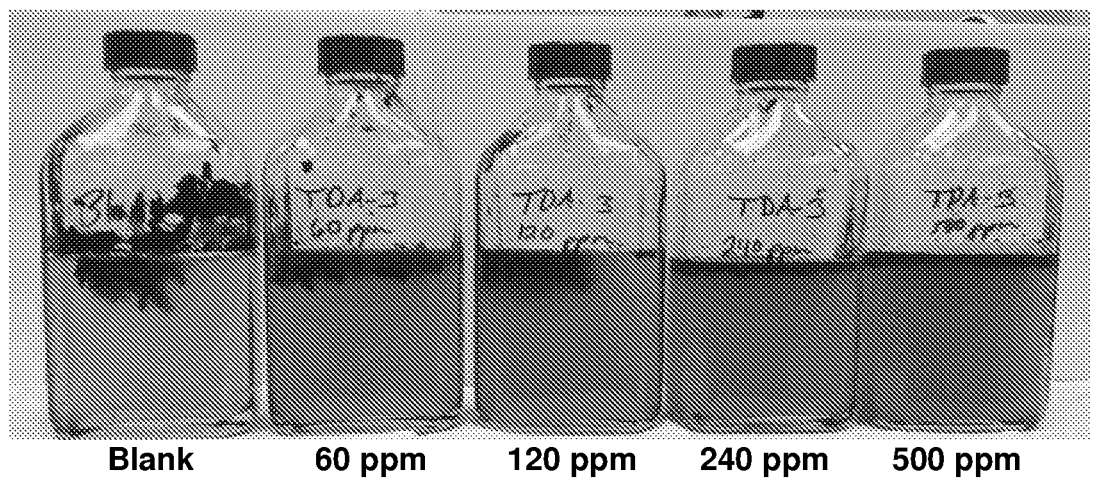
FIG. 2 shows the performance of NTDA-3 in crude oil and deionized water.

In Example 2, the procedure of Example 1 was followed with the exception that only NTDA-3 was used at various concentrations in deionized water shown in FIG. 2. As can be seen from FIG. 2, the minimum treating concentration for NTDA-3 is about 240 ppm.

Example 3

Figure 3:
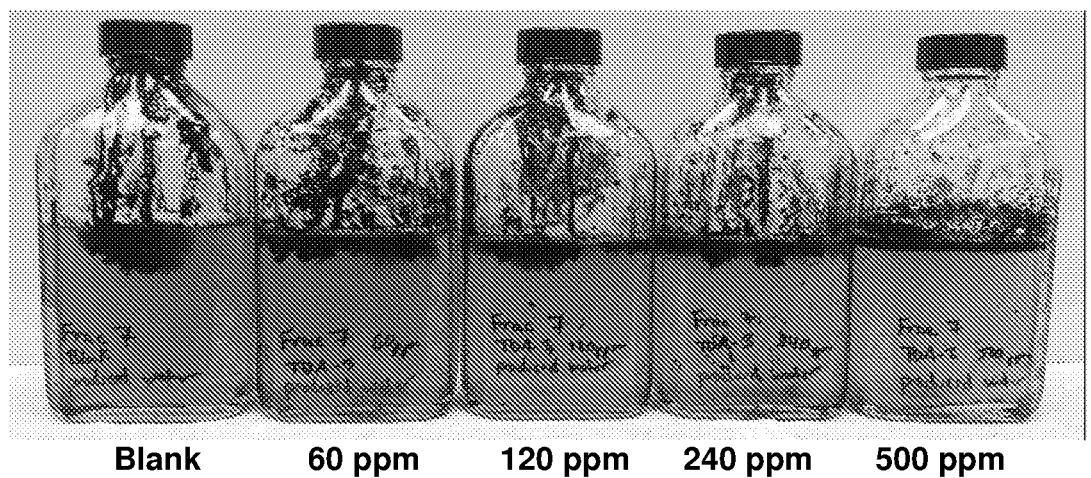
FIG. 3 shows the performance of NTDA-3 in crude oil and in produced water.

The procedure of Example 2 was followed with the exception that the water employed was produced water (PW). As is known, PW in most cases is largely brine containing numerous dissolved ions. As can be seen from FIG. 3, the minimum concentration of NTDA-3 which appears feasible is around 500 ppm. In this regard it is believed that the ions present in the PW interact with the surfactant (NTDA-3).

Example 4

Figure 4:
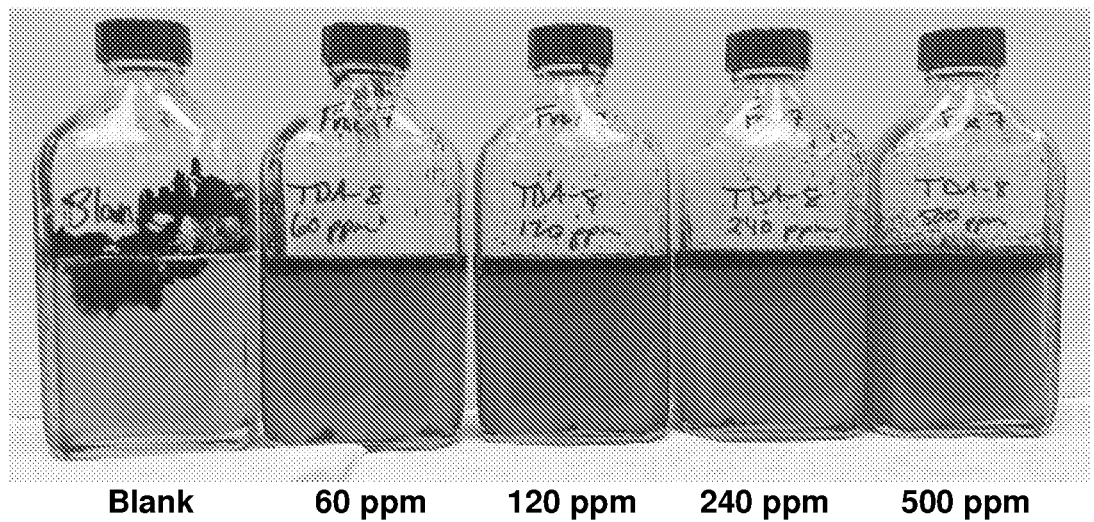
FIG. 4 shows the performance of NTDA-8 in crude oil and deionized water.
Figure 5:
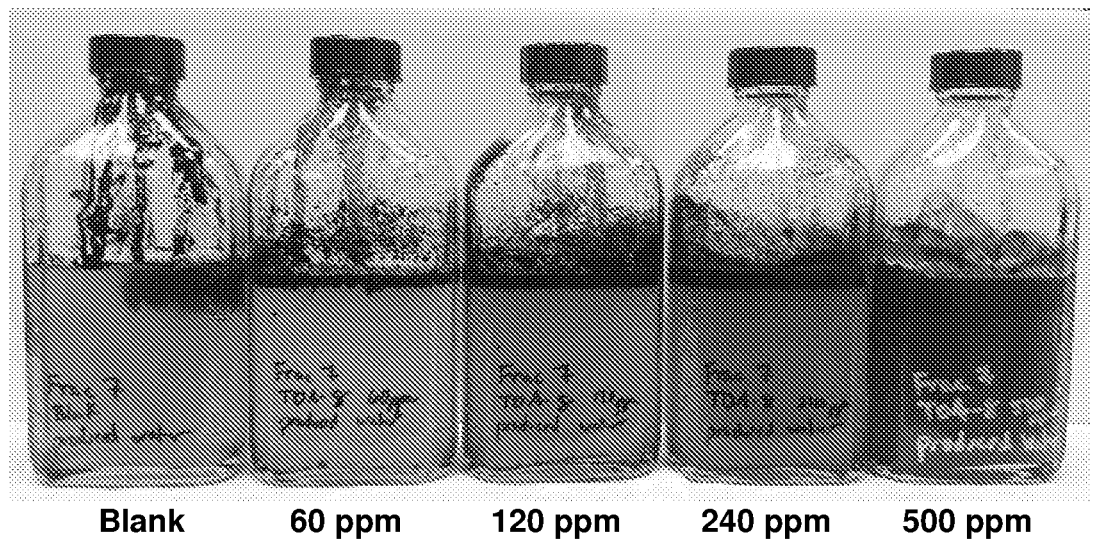
FIG. 5 shows the performance of NTDA-8 in crude oil and produced water.

The procedures of Examples 2 and 3 were followed with the exception that in both cases the NTDA-8 was used as the treating surfactant. The results are shown in FIGS. 4 and 5, FIG. 4 showing results in "DI water" and FIG. 5 showing results in PW. FIG. 4 and FIG. 5 show that the minimum treating composition for NTDA-8 is about 60 ppm both in DI water and PW. However, at a 500 ppm treating concentration in PW, there can be seen that an emulsion problem exists meaning that lower concentrations would generally be employed if the surfactant of was NTDA-8.

It was also found that all the tested NTDA-3-12 surfactants water wet oily solids such as corrosion by-products like iron sulfide and iron carbonate at concentrations between 60 ppm and 500 ppm. The solids are removed into the water phase leaving cleaner, brighter oil.

When using the surfactants of the present invention, a solvent such as dihexyl ether in and of itself or with a co-solvent listed in Table 1 is usually required to provide a composition and method which would not only remove paraffin/asphaltene deposits but would also act to inhibit the deposition of such deposits by preventing reagglomeration, crystal formation and other mechanisms leading to the precipitation of asphaltenes and paraffin waxes.

As can be seen from the above, the compositions and methods of the present invention offer a solution to the control of heavy hydrocarbons e.g. paraffins, and asphaltenes in crude oils. The compositions and methods can be used both to remove deposits of paraffin waxes and asphaltenes as well as maintain those heavy hydrocarbons dispersed in the crude oil. The data also demonstrates that analysis of the crude oil system to be treated is important since the crude oils vary widely in their composition as to paraffin/asphaltene content. Further the compositions can be used down hole, in flowlines or crude handling facilities e.g. storage tanks, other of the compositions e.g. certain of the surfactants, can be used in very low amounts to achieve desired results. Blends of dihexyl ether with certain co-solvents listed in Table 1 are shown to penetrate, dissolve/breakup paraffin/asphaltene solids. The surfactants e.g. the ethoxylates, were shown to disintegrate or disperse the paraffin/asphaltene solids into smaller particles and also prevent the particles from re-agglomerating. The surfactants employed also demonstrated good water wetting properties in terms of wetting the formation, casing surfaces as well as oily solids present in the oil, the latter allowing these solids to be removed into the water phase.

In using the compositions of the present invention, a wide variety of methods can be employed. For example certain of the compositions could be introduced into the wellbore, particularly in the producing formation in cases where the crude was a high asphaltene type crude to ensure that the asphaltenes did not interfere with production. Thus, in this case the treating solution could be introduced into the wellbore which could be shut in for a period of time or alternatively the treating composition could be circulated. In another method of use, the compositions could be injected intermittently into flowlines, production tubing and the like to ensure that paraffin/asphaltenes were kept dispersed in the crude oil during production, transfer and storage e.g. storage tanks, and the like.

Although specific embodiments of the invention have been described herein some detail, this has been done solely for the purpose of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A composition for use in controlling heavy hydrocarbon deposits, including both paraffins and asphaltenes, in oil and gas wells comprising:

A. an ether having the general formula:

     I wherein R and $R_1$ are each alkyl groups which, independent of each other, can be linear or branched containing from about 1 to about 29 carbon atoms, said ether being present in an amount of 40 wt % to 90 wt %

B. at least one additional component selected from the group consisting of:
   (i) an ester of the formula:

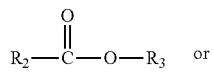     II

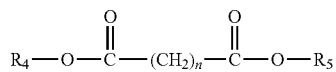     III wherein $R_2$-$R_5$ are linear or branched alkyl groups having from 1 to 30 carbon atoms and n is from 0 to 20;

(ii) an alkoxylated branched alcohol having the general formula:

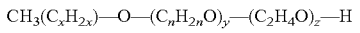     IV wherein x is from 3 to 30, n is from 2 to 4, y is from 0 to 6 and z is from 3 to 20;
   (iii) mixtures of (i) and (ii); and C. a hydrocarbon co-solvent comprising a liquid hydrocarbon containing from about 6 to about 30 carbon atoms, and from about 20 to about 90 wt % or greater naphthenics, isoparaffins, or mixtures thereof.

2. The composition of claim 1 wherein the co-solvent comprises from about 10 to about 35 wt % isoparaffins and, from about 30 to about 73 wt % naphthenics, all of which contain about 8 to about 30 carbon atoms.

3. The composition of claim 1 wherein the combined amount of ester and alkoxylated branched alcohol being present in an amount of from about 0.01 to about 5 wt %.

4. The composition of claim 3 wherein said co-solvent is present in an amount of from about 10 to about 90 wt %.

5. The composition of claim 1 wherein R and $R_1$ each contain from 5 to 7 carbon atoms.

6. A method of controlling heavy hydrocarbon deposits, including both paraffins and asphaltenes, in oil and gas wells and associated equipment comprising: I. providing the composition of claim 1; and II. performing an operation comprising dispersing paraffins and asphaltenes.

7. The method of claim 6 wherein said operation is conducted downhole.

8. The method of claim 6 wherein said operation is conducted on associated equipment.

9. The composition of claim 6 wherein said co-solvent comprises from about 10 to about 35 wt % isoparaffins and from about 30 to about 73 wt % napthenics, all of which contain about 8 to 30 carbon atoms.

10. The method of claim 6 wherein each of R and $R_1$ contain from 5 to 7 carbon atoms.

11. The composition of claim 1 wherein said alkoxylated branched alcohol is present in an amount of from about 0.006 to about 5 wt %.

12. The composition of claim 1 wherein said alkoxylated branched alcohol is present in an amount of from about 0.006 to about 0.05 wt %.

13. The composition of claim 1 wherein x is 12, n is from 2 to 4, y is from 0 to 6, and z is from 3 to 12.

* * * * *